United States Patent Office 3,408,349
Patented Oct. 29, 1968

3,408,349
AZINE ION-RADICAL SALTS
Yoshio Matsunaga, Stamford, Conn., assignor to American Cyanamid Company, Stamford, Conn., a corporation of Maine
No Drawing. Filed Dec. 4, 1963, Ser. No. 328,095
4 Claims. (Cl. 260—243)

This invention relates to new compositions of matter and more particularly to reaction products derived from azine donor materials and specific electron acceptors. More particularly, this invention relates to new compositions of matter derived from various thiazines and selenazines as the electron donors and dihalodicyano-p-benzoquinones as the electron acceptors, which reaction products or complexes may be designated hereinafter as azine ion-radical salts.

The azine ion-radical salts of this invention have, among other utilities, demonstrated that they are new semiconducting materials of the type that have been found useful in solid state semiconductor devices such as transistors, thermistors, rectifiers, diodes, photocells, photoconductors, radiation detectors, thermocouples, thermoelectric generators and Peltier cooling cells, among others.

Since there are but a limited number of known organic semiconductive materials and even fewer such materials which may be characterized as having simple molecular structures which exhibit resistivities of a low order, as for example less than 100 ohm-cm., the discovery of organic semiconducting materials constitutes an important scientific advance. It will be appreciated that as the number of organic semiconductors increases, the number of areas where organic semiconductors may be utilized increases.

Accordingly, it is an object of this invention to provide novel compositions of matter or complexes herein characterized as azine ion-radical salts.

It is a further object of this invention to provide such salts which may be characterized as having comparatively simple molecular structures and, in selected instances, relatively low resistivities, i.e., less than 100 ohm-cm. at room temperature, and to thus provide materials, particularly those having low resistivities, which are useful as organic semiconductors.

These and other objects and advantages of the present invention will become more apparent from the detailed description thereof set forth hereinbelow.

According to the present invention, new compositions of matter having the formula $$[D]_m[A]_n$$

are provided in which D is selected from the group consisting of phenothiazine, benzo[c]phenothiazine, dibenzo[c,d]phenothiazine, phenoselenazine, benzo[c]phenoselenazine, dibenzo[c,d]phenoselenazine and their N-lower alkyl derivatives and particularly N-methyl derivatives, A is a dihalogenodicyano-p-benzoquinone, $m$ is a positive integer of less than 4 and $n$ is a positive integer of less than 3.

The azines specified hereinabove have the following structural formulas:

phenothiazine

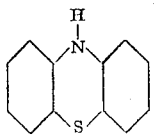

benzo[c]phenothiazine

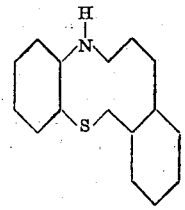

dibenzo[c,d]phenothiazine

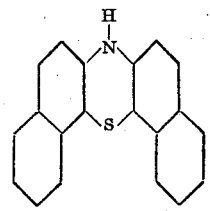

phenoselenazine

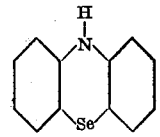

dibenzo[c,d]phenoselenazine

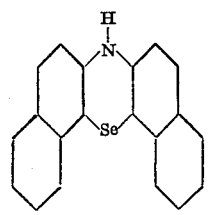

As noted above, their N-lower alkyl derivatives such as N-methyl, N-ethyl derivatives are contemplated for use in preparing the salts of this invention.

The dihalogenodicyano-p-benzoquinones are characterized by the general formula:

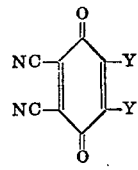

where Y is selected from the group consisting of chlorine, bromine and iodine.

The azine ion-radical salts contemplated by this invention may be prepared by mixing the components, that is, the azine donor, and the quinone acceptor in suitable solvents and recovering the product as a precipitate. Thus, typically the quinone is dissolved in a solvent such as benzene which is added to a solution of the azine, preferably in the same solvent, i.e., benzene, which preferably has been heated. After cooling, the resulting precipitate is separated, washed with suitable solvents and the product recovered.

Suitable solvents include those in which the reactants are mutually soluble, and preferably a common solvent is employed, although this need not be the case. Suitable solvents include benzene, xylene and acetonitrile.

The reaction referred to above may be carried out at ambient or room temperatures (20–40° C.), although lower and higher temperatures may be employed.

As has been noted above, certain of the azine ion-radical salts contemplated by this invention demonstrate highly useful properties as semiconductors. Thus, certain of the compounds have been found to be thermally stable and highly conductive, i.e., characterized by low resistivities, rendering them potentially suitable for use in thermoelectric applications.

The salts of this invention may be generally described as being black in color. Thus, in addition to their electrical properties, the materials of this invention may be employed as pigments in various systems, due to their low solubility and color, or as fillers in plastic compositions, particularly where specifically defined electrical properties are required. In addition, such salts are useful as free radical catalysts in the polymerization of polymerizable monomers, as for example styrene, to produce resinous polymers. Further, they may be employed as a chemical sensor since their conductance changes with the absorption of oxygen, or as pressure sensing devices in that their resistivities are known to change with pressure.

In order to illustrate the present invention, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

Preparation of the complex:

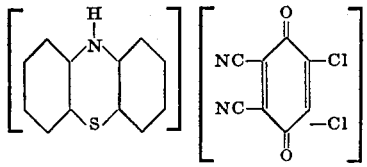

0.68 grams (3 mmoles) or less of dichlorodicyano-p-benzoquinone in 100 ml. of benzene was added to 50 ml. of a hot benzene solution of phenothiazine containing .60 gram (3 mmoles) of the thiazine. The resulting composition was cooled to room temperature and the black precipitate formed was filtered, washed with benzene and subsequently with ether.

Analysis of the product formed is as follows:

Theory, $C_{20}H_9NS \cdot C_8Cl_2N_2O_2$: C, 56.4%; H, 2.1%; Cl, 16.6%; S, 7.5%. Found: Preparation A, C, 57.2%; H, 2.3%; Cl, 15.9%; S, 7.8%. Preparation B, C, 56.9%; H, 2.8%; Cl, 16.4%; S, 7.7%.

EXAMPLE 2

Preparation of the complex:

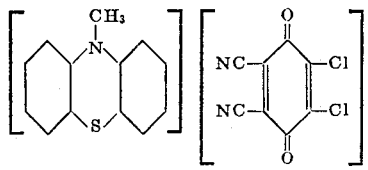

A cold benzene solution of dichlorodicyano-p-benzoquinone saturated with 0.68 gram (3.0 mmoles) of the quinone was mixed with a cold benzene solution of N-methylphenothiazine saturated with 0.64 gram (3.0 mmoles) of the thiazine. No precipitate appeared immediately. Brownish black crystals were deposited by evaporation of the solvent at room temperature.

Analysis of the product is as follows:

Theory, $C_{13}H_{11}NS \cdot C_8Cl_2N_2O_2$: C, 57.3%; H, 2.5%; Cl, 16.1%; S, 7.3%. Found: C, 56.8%; H, 2.6%; Cl, 16.7%; S, 7.2%.

EXAMPLE 3

Preparation of the complex:

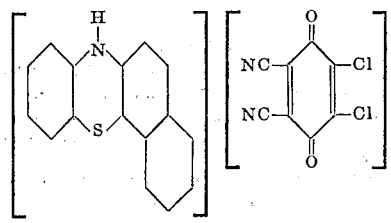

0.68 gram (3.0 mmoles) of dichlorodicyano-p-benzoquinone in 100 ml. of benzene was added to a 100 ml. hot benzene solution of benzo[c]phenothiazine containing 0.7 gram (3.0 mmoles) of the thiazine. The resulting composition was cooled to room temperature and the black precipitate formed was filtered, washed with benzene and subsequently with ether.

Analysis of the product is as follows:

Theory, $C_{16}H_{11}NS \cdot C_8Cl_2N_2O_2$: C, 60.5%; H, 2.3%; Cl, 14.9%; S, 6.7%. Found: Preparation A, C, 61.0%; H, 2.7%, Cl, 15.1%; S, 6.7%. Preparation B, C, 60.4%; H, 2.6%; Cl, 14.0%; S, 6.9%.

EXAMPLE 4

Preparation of the complex:

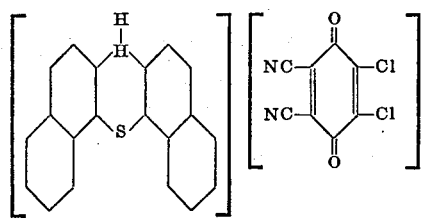

0.45 gram (2.0 mmoles) or more of dichlorodicyano-p-benzoquinone in 70 ml. of benzene was added to a 200 ml. hot benzene solution of dibenzo[c,d]phenothiazine containing 0.90 gram (3.0 mmoles) of the thiazine. The solution was cooled to room temperature and the black precipitate formed was filtered, washed with benzene and subsequently washed with ether.

Analysis of the product is as follows:

Theory, $C_{20}H_{13}NS \cdot C_8Cl_2N_2O_2$: C, 63.9%; H, 2.5%; Cl, 13.5%; S, 6.1%. Found: Preparation A, C, 63.9%; H, 2.6%; Cl, 12.9%; S, 6.4%. Preparation B, C, 63.6%; H, 2.5%; Cl, 14.3%; S, ----.

EXAMPLE 5

Preparation of the complex:

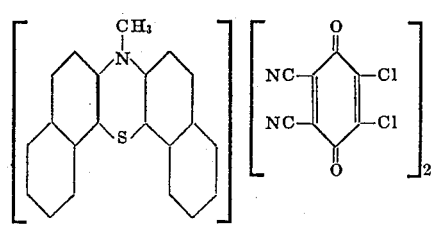

0.45 gram (2 mmoles) of dichlorodicyano-p-benzoquinone in 50 ml. of benzene was added to a 220 ml. hot xylene solution of N-methyldibenzophenothiazine containing 0.63 gram (2 mmoles) of the thiazine. The mixture was cooled to room temperature and the black precipitate formed was filtered and washed with benzene.

Analysis of the product is as follows:

Theory, $C_{21}H_{15}NS(C_8Cl_2N_2O_2)_2$: C, 57.9%; H, 2.0%; S, 4.2%; Cl, 18.5%. Found: C, 57.2%; H, 2.3%; S, 4.2%; Cl, 19.1%.

EXAMPLE 6

Preparation of the complex:

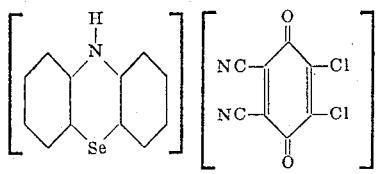

0.23 gram (1 mmole) of dichlorodicyano-p-benzoquinone in 50 ml. of benzene was added to a 50 ml. hot benzene solution of phenoselenazine containing 0.25 gram (1 mmole) of the selenazine. The resulting composition was cooled to room temperature and the black precipitate formed was filtered, washed with benzene and subsequently with ether.

EXAMPLE 7

Preparation of the complex:

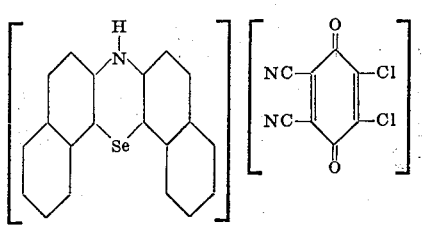

0.45 gram (2 mmoles) of dichlorodicyano-p-benzoquinone in 50 ml. of benene was added to a 220 ml. hot benzene solution of dibenzo[c,d]phenoselenazine containing 1.38 gram (4 mmoles) of the selenazine. The solution was cooled to room temperature and the black precipitate formed was filtered and washed with benzene.

Analysis of the product is as follows:

Theory, $C_{20}H_{13}NSe \cdot C_8Cl_2N_2O_2$: C, 58.7%; H, 2.3%; N, 7.3%; Cl, 12.4%. Found: Preparation A, C, 58.9%; H, 2.6%; N, 7.1%; Cl, 12.2%. Preparation B, C, 58.9%; H, 2.3%; N, 7.1%; Cl, 12.0%.

EXAMPLE 8

Preparation of the complex:

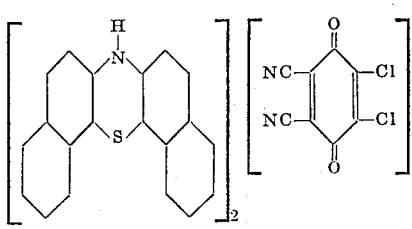

0.34 gram (1.5 mmoles) or less of dichlorodicyano-p-benzoquinone in 50 ml. of benzene was added to a 200 ml. hot benzene solution of dibenzo[c,d]phenothiazine containing 0.90 gram (3.0 mmoles) of the thiazine. The solution was cooled to room temperature and the black precipitate formed was filtered, washed with benzene and subsequently washed with ether.

Analysis of the product is as follows:

Theory, $(C_{20}H_{13}NS)_2 \cdot C_8Cl_2N_2O_2$: C, 69.9%; H, 3.2%; Cl, 8.6%; S, 7.8%. Found: Preparation A, C, 69.3%; H, 3.3%; Cl, 9.1%; S, 7.6%. Preparation B, C, 69.8%; H, 3.2%; Cl, 8.7%; S, 7.6%.

EXAMPLE 9

Preparation of the complex:

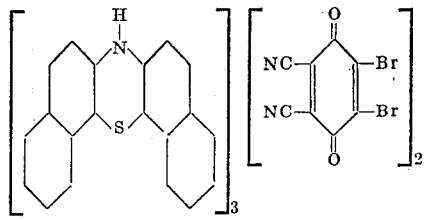

0.95 gram (3.0 mmoles) or less of dibromo-dicyano-p-benzoquinone in 50 ml. of benzene was added to 200 ml. of a hot benzene solution of dibenzo[c,d]phenothiazine containing 0.90 gram (3.0 mmoles) of the thiazine. The resulting composition was cooled to room temperature and the black precipitate formed was filtered, washed with benzene and subsequently with ether.

Analysis of the product formed is as follows:

Theory, $(C_{20}H_{13}NS)_3 \cdot (C_8Br_2N_2O_2)_2$: C, 59.6%; H, 2.5%; Br, 20.9%; S, 6.3%. Found: Preparation A, C, 59.2%; H, 2.6%; Br, 20.6%; S, 6.2%. Preparation B, C, 60.5%; H, 2.8%; Br, 20.5%; S, 6.6%.

EXAMPLE 10

Preparation of the complex:

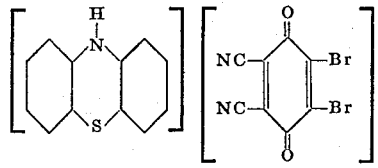

0.32 gram (1 mmole) of dibromodicyano-p-benzoquinone in 30 ml. of benzene was added to a 50 ml. hot benzene solution of phenothiazine containing 0.20 gram (1 mmole) of the thiazine. The mixture was cooled to room temperature and the black precipitate formed was filtered and washed with benzene and subsequently with ether.

Analysis of the product is as follows:

Theory, $C_{12}H_9NS \cdot C_8Br_2N_2O_2$: C, 46.6%; H, 1.8%; S, 6.2%; Br, 31.1%. Found: C, 47.1%; H, 2.0%; S, 6.2%; Br, 31.3%.

EXAMPLE 11

Preparation of the complex:

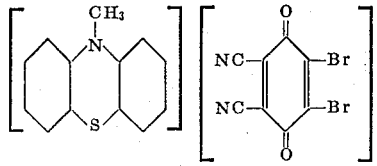

A cold benzene solution of N-methylphenothiazine saturated with 0.43 gram (2 mmoles) of the thiazine was mixed with a cold benzene solution of dibromodicyano-p-benzoquinone saturated with 0.63 gram (2 mmoles) of the quinone. No precipitate appeared. The brown-black crystals were obtained by evaporation of the solvent at room temperature.

Analysis of the product is as follows:

Theory, $C_{13}H_{11}NS \cdot C_8Br_2N_2O_2$: C, 47.7%; H, 2.1%, S, 6.0%; Br, 30.0%. Found: C, 47.4%; H, 2.2%; S, 5.59%; Br, 31.3%.

EXAMPLE 12
Preparation of the complex:

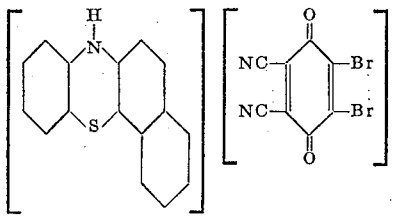

0.63 gram (2 mmoles) of dibromodicyano-p-benzoquinone in 50 ml. of benzene was added to a 200 ml. hot benzene solution of benzo[c]phenothiazine containing 0.60 gram (2 mmoles) of the thiazine. The mixture was cooled to room temperature and the black precipitate formed was filtered and washed with benzene and subsequently with ether.

Analysis of the product is as follows:

Theory, $C_{16}H_{11}NS \cdot C_8Br_2N_2O_2$: C, 51.0%; H, 1.9%; S, 5.7%; Br, 28.4%. Found: Preparation A, C, 51.2%; H, 2.2%; S, 5.8%; Br, 27.0%. Preparation B, C, 52.1%; H, 2.3%; S, 6.2%; Br, 28.6.

EXAMPLE 13
Preparation of the complex:

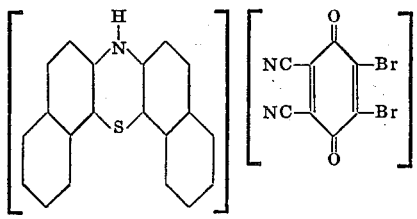

1.15 grams (3.6 mmoles) of dibromodicyano-p-benzoquinone in 50 ml. of benzene was added to a 400 ml. hot benzene solution of dibenzo[c,d]phenothiazine containing 0.69 gram (2.4 mmoles) of the thiazine. The mixture was cooled to room tempertaure and the black precipitate formed was filtered and washed with benzene.

Analysis of the product is as follows:

Theory, $C_{20}H_{13}NS \cdot C_8Br_2N_2O_2$: C, 54.6%; H, 2.1%, S, 5.2%; Br, 26.0%. Found: C, 54.6%; H, 2.7%; S, 5.6%; Br, 26.8%.

EXAMPLE 14
Preparation of the complex:

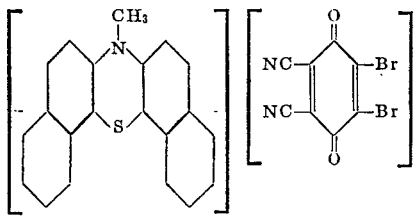

0.63 gram (2 mmoles) of dibromodicyano-p-benzoquinone in 50 ml. of xylene was added to a 200 ml. hot xylene solution of N-methyldibenzophenothiazine containing 0.63 gram (2 mmoles) of the thiazine. The mixture was cooled to room temperature and the black precipitate formed was filtered and washed with benzene.

Analysis of the product is as follows:

Theory, $C_{21}H_{15}NS(C_8Br_2N_2O_2)_2$: C, 47.0%; H, 1.6%; S, 3.4%; Br, 33.8%. Found: C, 44.3%; H, 2.0%; S, 2.9%; Br, 34.1%.

EXAMPLE 15
Preparation of the complex:

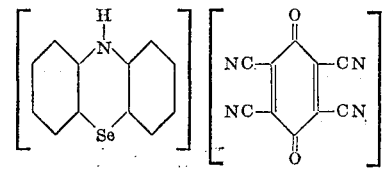

0.32 gram (1 mmole) of dibromodicyano-p-benzoquinone in 30 ml. of benzene was added to a 50 ml. hot benzene solution of phenoselenazine containing 0.25 gram (1 mmole) of the selenazine. The mixture was cooled to room temperature and the black precipitate formed was filtered and washed with benzene and subsequently with ether.

EXAMPLE 16
Preparation of the complex:

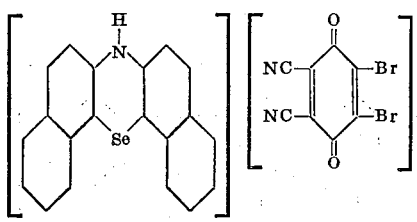

0.63 gram (2 mmoles) of dibromodicyano-p-benzoquinone in 50 ml. of benzene was added to a 220 ml. hot benzene solution of dibenzo[c,d]phenoselenazine containing 1.38 grams (4 mmoles) of the selenazine. The mixture was cooled to room temperature and the black precipitate formed was filtered and washed with benzene and subsequently with acetone.

Analysis of the product is as follows:

Theory, $C_{20}H_{13}NSe \cdot C_8Br_2N_2O_2$: C, 50.8%; H, 2.0%; N, 6.4%; Br, 24.1%. Found: Preparation A, C, 50.9%; H, 2.2%; N, 6.0%; Br, 23.2%. Preparation B, C, 49.9%; H, 2.0%; N, 6.6%; Br, 23.7%.

Electrical resistivity measurements on the salts were carried out on pressed pellets of these salts by a potential probe method. In this case, current probes, about 10 mm. apart, were made by painting the ends of a rod-like pellet with Ag paste. The potential probes were two Mo wires, 1 mm. apart, stretched by springs on the pellet. The sample pellet, a decade resistor, General Radio Type No. 1432–N and a 1.5 volt dry cell were connected in series. The potential developed across the Mo wires were compared with that across the standard resistance using a Cambridge Vernier potentiometer. The resistivity, $\rho$, was obtained by $$\rho = \frac{A}{L} Ro \frac{V}{Vo}$$

where A is the area of the cross-section of pellet, 0.50 cm.², L is the distance between the potential probes, 1 mm., Ro is the standard resistance, V is the potential across the Mo wires, and Vo is the potential across Ro.

The temperature-dependence of these salts was examined in the range of 0° C. to 120° C. and it was found that the resistivities obeyed the usual exponential law $$\rho = \rho_0 \exp. (Eg/2kT)$$

which has been observed in most other organic materials. In the above formula, $\rho$ equals the resistivity, $\rho_0$ equals a constant, Eg equals the energy gap, $k$ equals the Boltzmann constant and T equals the temperature in ° K.

The thermoelectric power was found to be positive for all types of salts.

The electrical properties of the salts of this invention are set forth hereinbelow.

ELECTRICAL PROPERTIES

| Ex. No. | Salt | ρ (20° C.) | Eg |
|---|---|---|---|
| 1 | $C_{12}H_9NS \cdot C_8Cl_2N_2O_2$ | $2\times10^4$ | 0.72. |
| 2 | $C_{13}H_{11}NS \cdot C_8Cl_2N_2O_2$ | $2\times10^5$ | 0.66. |
| 3 | $C_{16}H_{11}NS \cdot C_8Cl_2N_2O_2$ | $4\times10^3$ | 0.48. |
| 4 | $C_{20}H_{13}NS \cdot C_8Cl_2N_2O_2$ | 5,000 | 0.54. |
| 5 | $C_{21}H_{15}NS \cdot (C_8Cl_2N_2O_2)_2$ | $2\times10^4$ | Not measured. |
| 6 | $C_{12}H_9NSe \cdot C_8Cl_2N_2O_2$ | $1\times10^5$ | 0.76. |
| 7 | $C_{20}H_{13}NSe \cdot C_8Cl_2C_2N_2O_2$ | $6\times10^3$ | Not measured. |
| 8 | $(C_{20}H_{13}NS)_2 \cdot C_8Cl_2N_2O_2$ | 17 ohm-cm | 0.18 ev. |
| 9 | $(C_{20}H_{13}NS)_3 \cdot (C_8Br_2N_2O_2)_2$ | 240 | 0.28. |
| 10 | $C_{12}H_9NS \cdot C_8Br_2N_2O_2$ | $2\times10^4$ | 0.76. |
| 11 | $C_{13}H_{11}NS \cdot C_8Br_2N_2O_2$ | $4\times10^5$ | 0.72. |
| 12 | $C_{16}H_{11}NS \cdot C_8Br_2N_2O_2$ | $3\times10^4$ | 0.60. |
| 13 | $C_{20}H_{13}NS \cdot C_8Br_2N_2O_2$ | $10^8$ | 1.06. |
| 14 | $C_{21}H_{15}NS \cdot (C_8Br_2N_2O_2)_2$ | $8\times10^5$ | Not measured. |
| 15 | $C_{12}H_9NSe \cdot C_8Br_2N_2O_2$ | $2\times10^5$ | 0.80. |
| 16 | $C_{20}H_{13}NSe \cdot C_8Br_2N_2O_2$ | $5\times10^4$ | Not measured. |

The Eg or energy gap is determined by the temperature-dependence of electrical resistivity using the equation set forth above.

Because the electrical properties of these azine ion-radical salts may be affected by departure from exact stoichiometric conditions, high purity raw materials should be employed in their preparation. Influencing of the electrical properties may be achieved deliberately by the inclusion of various impurities or dopants.

What is claimed is:
1. A complex of the formula

$$[D]_m[A]_n$$

where D is selected from the group consisting of phenothiazine, benzo[c]phenothiazine, dibenzo[c,d]phenothiazine, phenoselenazine, dibenzo[c,d]phenoselenazine and their N-lower alkyl derivatives, A is a dihalogenodicyano-p-benzoquinone wherein the halogen is selected from the group consisting of chlorine, bromine and iodine, m is a positive integer of less than 4 and n is a positive integer of less than 3.

2. A complex of the formula $$[D]_m[A]_n$$

where D is selected from the group consisting of phenothiazine, N-methylphenothiazine, benzo[c] phenothiazine, dibenzo[c,d]phenothiazine, phenoselenazine and dibenzo [c,d]phenothiazine, A is a dihalogenodicyano-p-benzoquinone wherein the halogen is selected from the group consisting of chlorine, bromine and iodine and m and n are 1.

3. A complex of the formula $$[D]_m[A]_n$$

where D is dibenzo[c,d]phenothiazine, A is dichlorodicyano-p-benzoquinone, m equals 2 and n equals 1.

4. A complex of the formula $$[D]_m[A]_n$$

where D is dibenzo[c,d]phenothiazine, A is dibromodicyano-p-benzoquinone, m equals 3 and n equals 2.

References Cited

UNITED STATES PATENTS 3,117,125  1/1964  Wilson _____ 260—243

HENRY R. JILES, *Primary Examiner.*

H. I. MOATZ, *Assistant Examiner.*

UNITED STATES PATENT OFFICE
CERTIFICATE OF CORRECTION

Patent No. 3,408,349                          October 29, 1968

Yoshio Matsunaga

It is certified that error appears in the above identified patent and that said Letters Patent are hereby corrected as shown below:

Column 4, line 17, "0.7" should read -- .75 --; lines 30 to 38, the left-hand portion of the formula reading

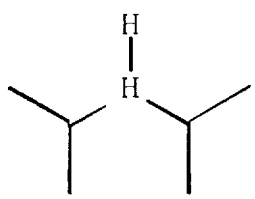 should read 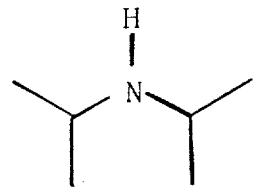

same column 4, line 67, "benzene was added to a 220" should read -- xylene was added to a 200 --. Column 7, lines 55 to 65, "2" should appear at the lower portion of the right-hand portion of the closing bracket. Column 9, in the table, second column, line 7 thereof, "$C_{20}H_{13}NSe \cdot C_8Cl_2C_2N_2O_2$" should read -- $C_{20}H_{13}NSe \cdot C_8Cl_2N_2O_2$ --.

Signed and sealed this 17th day of March 1970.

(SEAL)
Attest:

EDWARD M. FLETCHER, JR.                        WILLIAM E. SCHUYLER, JR.
Attesting Officer                                  Commissioner of Patents